United States Patent [19]

Kuehler

[11] Patent Number: 4,559,132

[45] Date of Patent: Dec. 17, 1985

[54] UPFLOW PACKED BED CATALYTIC REACTOR WITH PERIODIC BED EXPANSION

[75] Inventor: Christopher W. Kuehler, Larkspur, Calif.

[73] Assignee: Chevron Research Company, San Francisco, Calif.

[21] Appl. No.: 308,339

[22] Filed: Oct. 5, 1981

[51] Int. Cl.$^4$ .............................................. C10G 9/28
[52] U.S. Cl. ................................ 208/157; 208/158; 261/94
[58] Field of Search ............... 208/157, 158, 176, 146; 422/139, 140, 143; 261/94, 81, 82, 123

[56] References Cited

U.S. PATENT DOCUMENTS

| | | | |
|---|---|---|---|
| 2,082,363 | 6/1937 | Stone | 261/123 |
| 2,268,187 | 1/1939 | Churchill, Jr. | 208/146 |
| 2,307,434 | 1/1943 | Veltman | 196/52 |
| 2,603,591 | 7/1952 | Evans | 208/146 |
| 2,715,521 | 8/1955 | Tatibana | 261/123 |
| 2,987,465 | 6/1961 | Johanson | 208/146 |
| 3,523,888 | 8/1970 | Stewart et al. | 422/140 X |
| 3,855,368 | 12/1974 | Prochazka et al. | 261/81 |
| 3,926,783 | 12/1975 | Wolk | 208/157 |
| 4,123,348 | 10/1978 | Wurfel | 208/10 |
| 4,191,629 | 3/1980 | Chervenak | 208/10 |

FOREIGN PATENT DOCUMENTS 152440  10/1952  Australia ............................ 585/953

OTHER PUBLICATIONS

V. N. Schrodt, Ind. Eng. Chem. Fundamentals, 4, 108 (1965).
Chem. Eng. Proc. Sym. Ser., vol. 66, No. 105, (1970) pp. 47–57.

*Primary Examiner*—D. E. Gantz
*Assistant Examiner*—Glenn A. Caldarola
*Attorney, Agent, or Firm*—S. R. LaPaglia; W. K. Turner; V. J. Cavalieri

[57] ABSTRACT

A gas-liquid or a gas-liquid-solid feed is contacted in a vessel containing a packed bed of contact particles. At least a portion of the feed is passed upwardly through the packed bed and the mass flow rate of the feed is periodically increased sufficiently to cause a portion of the particles within the vessel to form an expanded region within the packed bed.

20 Claims, 1 Drawing Figure

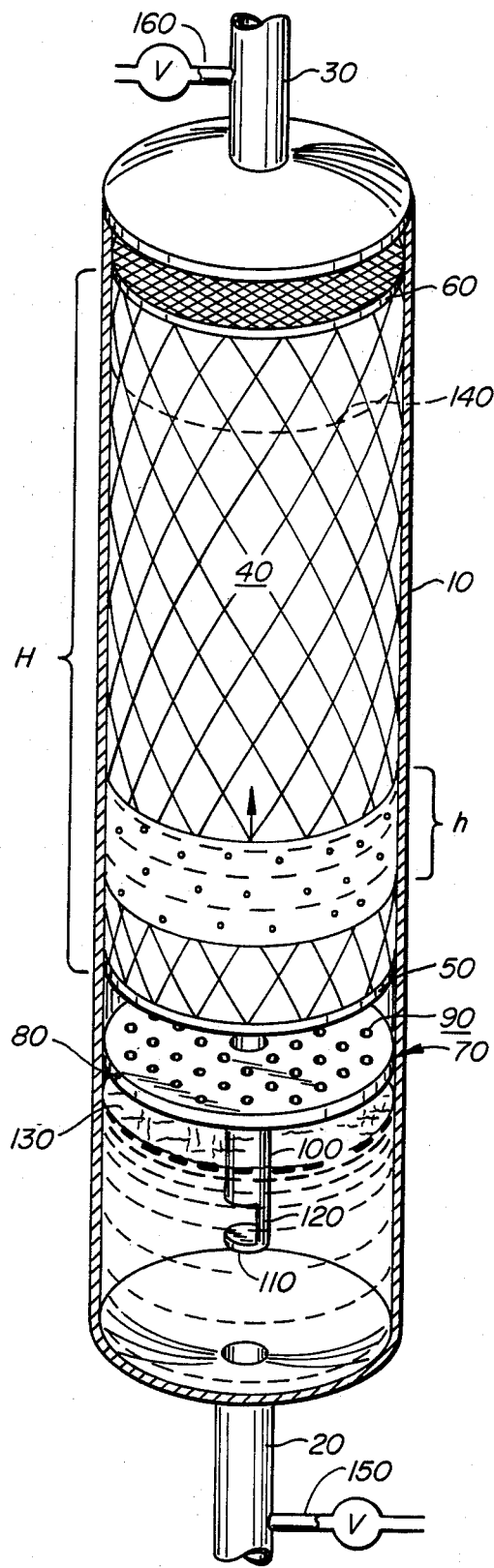

UPFLOW PACKED BED CATALYTIC REACTOR WITH PERIODIC BED EXPANSION

BACKGROUND OF THE INVENTION

This invention relates to upflow reactor systems for gas-liquid or gas-liquid-solid feeds. More particularly, this invention relates to upflow reactor systems containing one or more packed beds of contact particles. Upflow ebullated bed reactors have been described in numerous patents and publications. These reactors contain a continuously expanded bed of catalysts or other particles which move randomly throughout the reactor. During operation ebullated beds can be expanded to a volume of 10 to 150% more than the rest volume of the particle bed; see, for example U.S. Pat. No. 4,191,629. Ebullated bed reactors are capable of processing heavy feeds, such as heavy petroleum residua and coal/solid slurries, while providing for low back pressure and continual catalyst replacement. Ebullated bed reactors are particularly attractive for processing solids-containing feeds because the solids can be entrained upwardly through the ebullated bed without causing plugging.

A disadvantage of ebullated bed reactors is that the particle density within the bed is low relative to that of a packed bed. Another disadvantage is that the random motion of materials within the bed causes gross backmixing. Consequently, the concentration of reactants and products becomes essentially uniform within the reactor, thereby resulting in lower reaction rates than are available in packed bed reactors.

One approach to overcoming the disadvantages of ebullating bed reactors is described in U.S. Pat. No. 4,123,348, wherein catalyst particles in an expanded bed are maintained in a continuously pulsating motion achieved by the pulsating addition of one of the reactants to the reaction zone. The continuously pulsating catalyst particles are said to have a greater density of particles than typically achieved in ebullating beds. Gross top-to-bottom vertical backmixing of reactants would nevertheless be obtained in such a process and reaction rates would be lower than obtainable in packed bed reactors.

A process employing a variable feed rate is disclosed in U.S. Pat. No. 2,603,591. Liquid feed is passed into the upper portion of a reactor and gas feed is passed into the lower portion. By manipulation of inlet and outlet valves the feeds are flowed horizontally through a particle bed. U.S. Pat. No. 2,307,434 discloses a downflow reactor with a periodically varying feed pressure. The article "Pulsed-Bed Approach to Fluidization", Kobayashi et al, Chem. Eng. Proc. Sym. Ser., Vol. 66, No. 105 (1970) pp. 47-57 discloses pulsed feed to fluidized beds.

SUMMARY OF THE INVENTION

According to this invention a process is provided for contacting a gas-liquid or gas-liquid-solid feed in an upflow reactor. The process can be operated to obtain favorable reactor performance similar to that of a packed bed reactor, while providing the solids handling advantages of an ebullating bed reactor. This invention comprises a process for contacting a gas-liquid or a gas-liquid-solid feed in a reactor vessel containing a packed bed of contact particles, comprising (a) introducing at least a portion of the feed into the lower region of the reactor and passing the portion upwardly through the packed bed of contact particles; (b) periodically increasing the mass flow rate of feed to the reactor sufficiently to cause a portion of the contact particles within the reactor to form an expanded region of contact particles within the packed bed; (c) periodically decreasing the increased mass flow rate sufficiently to cause the contact particles in the thus-expanded region to settle into a packed bed and (d) withdrawing an effluent stream from the upper region of the reactor. While the mass flow rate could be increased sufficiently to expand the entire bed, only a portion of the bed need be expanded. When only a portion of the bed is expanded, the expanded region normally extends substantially entirely across the bed in a plane perpendicular to the direction of flow, and the expanded region is propagated upwardly through the bed in a wave motion. The mass flow rate can be increased by periodically increasing the feed rate of liquid and/or gas to the reactor or by periodically decreasing the pressure downstream of one or more feed inlets to the reactor.

BRIEF DESCRIPTION OF THE DRAWING

The single FIGURE of the drawing depicts a reactor design for carrying out the process of this invention.

DETAILED DESCRIPTION OF THE INVENTION

The feed to the reactor can be virtually any gas-liquid or gas-liquid-solid feedstock. It has been found that the desirable periodic partial bed expansion of this invention is not obtained with feedstocks of only liquid or gas phases. Feedstocks may be introduced in the reactor at the same or different locations, so long as a gas and a liquid flow co-currently and upwardly through the packed bed in the reactor.

This invention is particularly applicable to the processing of hydrocarbonaceous liquid feedstocks. Such feedstocks include crude petroleum oils, atmospheric or vacuum residua, topped crudes, reduced crudes or a fraction thereof, as well as distillate petroleum fractions. The feedstocks can also contain suspended matter such as added catalysts or contact materials. Feed may also be coal-solvent or coal-petroleum mixtures; coal-derived liquids containing suspended coal-derived solids such as ash; hydrocarbonaceous liquids derived from the bituminous, sub-bituminous, brown coals or lignite; hydrocarbonaceous liquids derived from oil shale by retorting or extraction; and hydrocarbonaceous liquids derived from other mineral sources, such as tar sands, gilsonite, etc.

The process of this invention is particularly advantageous for treating solids-containing (i.e. at least 1 wt.%) feedstocks. Such feeds can be effluent slurries from upstream processing steps, for example, effluent from a first-stage coal dissolution zone, where coal is dissolved in a coal-derived recycle solvent or a petroleum or petroleum-derived solvent, with or without added dissolution catalysts or contact particles. Examples of coal liquefaction process suitable for application of the process of this invention are disclosed in U.S. Pat. No. 4,264,429 to Rosenthal et al for "Two-Stage Coal Liquefaction Process with Process-Derived Solvent" and U.S. Pat. No. 4,255,248 to Rosenthal et al for "Two-Stage Coal Liquefaction Process with Process-Derived Solvent Having a Low Heptane Insolubles Content" which are incorporated herein by reference.

Solids within the bed are present as a gravity-packed bed except during periods of partial bed expansion. Packed beds include fixed beds, continuously moving beds, and fixed beds which move periodically to provide for partial catalyst replacement. Solids used in the process of this invention can be substantially non-catalytic contact particles, such as bauxite, alumina, or silica, Raschig rings, spheres, etc. The particles may also be catalytic particles, such as particulate hydroprocessing catalysts useful in the petroleum industry. Examples of such hydroprocessing catalysts include catalysts having one or more elements from Group VI(B) and Group VIII of the Periodic Table of the Elements (Handbook of Chemistry and Physics, 45th Ed. Chemical Rubber Co.), supported on refractory inorganic supports such as alumina, silica, magnesia, boria, titania, or clays, such as attapulgite, sepiolite, halloysite, kaolinite, imogolite, palygorskite, etc. or mixtures thereof. Any commercial catalysts suitable for processing a feedstock in an upflow reactor are suitable for use in the process of this invention. The bed of particulate contact particles can contain combinations of catalytic and non-catalytic materials including inexpensive guard catalysts such as spent catalysts, red mud, FCC catalyst fines, etc.

According to this invention the bed in the reactor is at least partially expanded by periodically varying the mass flow rate to the reactor. All that is necessary is that the mass flow rate of feed to the reactor be increased sufficiently to cause a portion of the contact particles in the reactor to form an expanded region within the packed particle bed. For purposes of this invention, an expanded region means a region of significantly lower catalyst particle density, e.g., at least about 10% lower, e.g. 30, 40, or 50+% lower than the catalyst density within the unexpanded portions of the packed bed. The mass feed rate of liquid feed alone can be increased, either by recycling a portion of liquid products or by introducing an auxiliary liquid feed stream to the reactor. Likewise the gas feed rate alone can be varied by addition of auxiliary gas or by recycle of gas products to the reactor. A disadvantage of increasing only the gas flow rate is that channeling of gas may occur.

The increased mass flow rate is then decreased sufficiently to cause contact particles within the expanded region to settle into a packed bed. After the expanded region has traveled upwardly through the bed, the expanded region will be eliminated.

The exact amplitude of the increase in mass flow rate necessary to expand a portion of the bed will depend upon the physical properties of the components of the feed and of the particles in the bed, and can be determined by routine experimentation. Generally the increase in mass flow rate will be on the order of about 25 times the normal mass flow rate, or more, and generally will not need to be above about 50 times the normal mass flow rate, however, some variation in these numbers can be expected. The pulse can be of very short duration, e.g. less than about five or ten seconds, if desired.

A suitable variation in feed rate causes a "pressure pulse" which causes a partial bed expansion characterized by the formation of an expanded region within the packed bed which can extend in a plane across a horizontal cross-section of the bed, perpendicular to the direction of the flow of feed. This expanded region propagates upwardly through the bed with a wave motion as catalyst particles in the lower portion of the expanded region settle into the packed region below, and particles fall into the expanded region from the packed region above. The volumetric ratio of gas to liquid at the feed pressure generally should be at least about 5:1, preferably from 10:1 to 15:1.

It is expected that the height of the expanded region will be dependent upon the magnitude of the pressure pulse caused by the increase in mass flow rate. A higher increase in flow rate and a longer duration of the increased flow will result in a larger expanded region within the reactor. Preferably, the entire gas-liquid or gas-liquid-solid feed to the reactor is passed upwardly through the bed of contact particles.

The reactor can contain a single packed bed or a multiple packed bed separated by regions substantially empty of contact particles. If multiple packed beds are employed, the bed expansion region can travel upwardly through a series of packed beds. One or more feed materials can be added between the packed beds, if desired. It is within the scope of this invention to mechanically agitate the catalyst beds if desirable, however, mechanical vibrations produced by such agitation may be detrimental in large systems.

According to this invention, continuous expansion of particles within the reactor should be avoided because the reactor performance would resemble that of stirred beds or ebullating bed reactors. The expanded region of contact particles in the process of this invention should exist for no more than about 20% of the operation period of the reactor, preferably, for no more than 10% or for no more than 1% of the operation period. It is contemplated, however, that very small expanded regions which travel upwardly may be accommodated for longer periods of time, perhaps even continuously, without detracting significantly from the reaction kinetics. The duration of the increased mass flow rate to cause the formation of expanded region within the bed can be for no longer than about 15 minutes per operating day on the average and at an average frequency range of one cycle (increase and decrease of flow rate) per minute to one cycle per 3 hours.

The expansion of a portion of the bed according to this invention is particularly advantageous for processes in which the feed contains solids or in which solids can be formed within the reactor, e.g., coke, formed during petroleum processing. Because the expanded region travels upwardly through the bed, trapped solid particles can be released from lower regions and entrained upwardly along with the expanded region until reaching the top of the reactor wherein they can be expelled with the effluent. The process is particularly suitable for exothermic reactions because the periodic catalyst movement can eliminate hot spots within the reactor.

The periodic increase and decrease of feed rate to the reactor can be either at regular or irregular intervals. If desired the periodic increases cn be regulated to occur only when certain events occur, such as localized overheating or undesirable pressure drops accompanying localized plug formation. The periodic expansion of the bed permits the feed to contain larger particles than might otherwise be tolerable since plugging probability will be reduced.

The increase in mass flow rate to the reactor should be regulated to avoid entrainment of contact particles from the reactor. Screens can be provided for this purpose, if desired. Alternately, the reactor can contain a section of expanded diameter above the normal level of expanded particles to reduce the fluid velocity and cause entrained particles to settle back into the bed.

The following experimental example illustrates a laboratory scale example of the process of this invention.

EXAMPLE 1

A bed of contact particles approximately 40 centimeters in height was contained in a 61 centimeters long glass reactor having a 1.58 centimeter diameter. A feed containing pearl oil and nitrogen was passed upwardly through the reactor. The pearl oil was introduced at 1000 cc./hr. and the nitrogen was introduced at a rate of 14 liters per hour. This corresponded to a gas feed rate of about 1780 liters per liter of liquid feed at reaction conditions. A portion of effluent from the upper portion of the reactor was recycled through 7.9 millimeter i.d. tubing through a peristaltic pump (Varistaltic Pump Model 72-590-60, Manostat Co.) which imparted a high impulse to the recycle stream. The peristaltic pump introduced recycle at an average of only 350 cc./hr., and the pressure pulse caused the formation of expanded regions which traveled upwardly through the bed. The frequency of the formation of expanded regions corresponded to the pressure pulse frequency.

Four types of particles were employed within the vessel; 2.5 millimeter diameter spheres; 2.5 milimeter diameter cylindrical extrudates about 6.4 millimeters in length; 1.6 millimeters diameter spheres; and 0.8 millimeter diameter cylindrical extrudate about 6.4 millimeters in length. These particles behaved differently within the bed. The 2.5 millimeter diameter spheres and cylindrical extrudate expanded well. The smaller particles moved as plugs, occasionally separating without forming expanded regions.

At one point the peristaltic pump for the recycle stream was replaced by a positive displacement pump with a stroke period of several seconds. The bed expanded but without a distinct correlation with the pressure stroke. The partial bed expansion was due to the high impulse of the peristaltic pump relative to the more powerful positive displacement pump.

Based upon these results the process can readily be scaled up to commercial size. The following example with reference to the drawing is illustrative of a contemplated mode of operation of the process of this invention.

EXAMPLE

A vertically oriented reactor vessel 10 has a lower feed inlet port 20 and an outlet port 30. A fixed bed containing particulate catalyst 40, is maintained in the vessel between the lowest support grid 50 attached to the inner wall of the vessel 10. If desired, a catalyst retaining screen 60 is also secured to the vessel wall. A flow distributor generally characterized by reference numeral 70 is attached to the inner wall of the vessel 10 between inlet port 20 and the catalyst support grid 50. The distributor is comprised of plate 80 extending over the full cross-sectional area of vessel 10. The plate has a plurality of perforations or holes 90 extending therethrough. Preferably, the perforations are evenly distributed over the total cross-sectional area of the plate, at about 20 to 250 or more, preferably about 40 to 250 perforations per square meter. Open-ended tube 100 is fixed to the plate 80 and extends downwardly from a central aperture in the plate. A cap 110 is provided to the lower end of tube 100 to prevent gases in the feed from passing directly up to the tube.

During operation, a mixed phase gas-liquid or gas-liquid-solid feedstream is pumped or otherwise introduced into the bottom of vessel 10 to enter port 20. The distributor is designed for feed conditions such that a gas pocket or vapor space 130 which has a height substantially equal to or less than the length of tube 100 is formed under steady state conditions. Substantially all, i.e., at least 75%, of gas and vapor components of the feed pass through holes 90 and substantially all the liquid and solid components of the feed pass through tube 100. The rest or unexpanded height of the packed bed 40 is indicated by dotted line 140. Supplementary feed is periodically introduced through line 150 at the desired intervals. The increased feed through line 150 causes the formation of an expanded region of height h, which is magnified in the figure for clarity. This travels upwardly through the packed bed as particles drop into the expanded region from above and settle out below the expanded region. The height of the packed bed reactor including the expanded region is represented by H, and h is preferably less than 10% of H. Alternately or concurrently the feed rate can be increased by reducing the pressure in line 160 and removing a portion of the gas or liquid effluents from the reactor.

The above example is for illustrative purposes only and is not intended to limit the invention. It will be apparent to those skilled in the art of reactor design that the reactor can have a number of different configurations without departing from the spirit and scope of this invention and such designs and the processes carried out therein are considered equivalents of this invention.

I claim:

1. A process for contacting a gas-liquid feed in a reactor vessel containing a packed bed of contact particles, said process comprising
    (a) introducing at least a portion of said feed into the lower region of said vessel and passing said portion upwardly through said packed bed of contact particles;
    (b) increasing the mass flow rate of feed to said vessel sufficiently to cause a portion of said contact particles within said vessel to form an expanded region within said packed bed, and maintaining said increased flow rate for not more than 20% of the operating period of said process and wherein said mass flow rate of feed is increased for a period no longer than 15 minutes per operating day and at an average frequency within the range of one cycle per minute to one cycle per three hours;
    (c) decreasing the increased mass flow rate sufficiently to cause the contact particles in the thus-expanded region to settle into a packed bed; and
    (d) withdrawing an effluent stream from the upper region of said vessel.

2. The process according to claim 1 wherein step (b) causes the formation of an expanded region of said contact particles which extends substantially entirely across said bed, perpendicular to the direction of flow, and said expanded region is propagated upwardly through said bed.

3. The process according to claim 2 wherein said expanded region has a height less than about 10% of the height of said packed bed containing said expanded region.

4. The process according to claim 1, 2, or 3, wherein said mass flow rate is increased by increasing the feed rate of liquid and gas to said vessel.

5. The process according to claim 1, 2, or 3, wherein said mass flow rate is increased by increasing the feed rate of liquid to said vessel.

6. The process according to claim 1, 2, or 3, wherein said mass flow is increased by increasing the feed rate of gas to said vessel.

7. The process according to claim 1, 2, or 3, wherein said mass flow rate is increased by decreasing the pressure downstream of at least one inlet for feed to said vessel.

8. The process according to claim 1, 2, or 3, wherein said mass flow rate is periodically increased at such intervals that an expanded region of contact particles exists for no more than 20% of the operation period of said vessel.

9. The process according to claim 8 wherein said expanded region of contact particles exists for no more than 10% of the operation period of said vessel.

10. The process according to claim 8 wherein said expanded region of contact particles exists for no more than 1% of the operation period of said vessel.

11. A process for contacting a gas-liquid feed in a reactor vessel containing a packed bed of contact particles, said process comprising
 (a) introducing at least a portion of said feed into the lower region of said vessel and passing said portion upwardly through said packed bed of contact particles;
 (b) increasing the mass flow rate of feed to said vessel sufficiently to cause a portion of said contact particles within said vessel to form an expanded region within said packed bed, and maintaining said increased flow rate for not more than 20% of the operating period of said process and wherein said mass flow rate of feed is increased for a period no longer than 15 minutes per operating day and at an average frequency within the range of one cycle per minute to one cycle per three hours;
 (c) decreasing the increased mass flow rate sufficiently to cause the contact particles in the thus-expanded region to settle into a packed bed; and
 (d) withdrawing an effluent stream from the upper region of said vessel.

12. The process according to claim 11 wherein step (b) causes the formation of an expanded region of said contact particles which extends substantially entirely across said bed, perpendicular to the direction of flow, and said expanded region is propagated upwardly through said bed.

13. The process according to claim 12 wherein said expanded region has a height less than about 10% of the height of said packed bed containing said expanded region.

14. The process according to claim 11, 12, or 13, wherein said mass flow rate is increased by periodically increasing the feed rate of liquid and gas to said vessel.

15. The process according to claim 11, 12, or 13 wherein said mass flow rate is increased by increasing the feed rate of liquid to said vessel.

16. The process according to claim 11, 12, or 13 wherein said mass flow rate is increased by increasing the feed rate of gas to said vessel.

17. The process according to claim 11, 12, or 13 wherein said mass flow rate is increased by decreasing the pressure downstream of at least one inlet for feed to said vessel.

18. The process according to claim 11, 12, or 13 wherein said mass flow rate is periodically increased at such intervals than an expanded region of contact particles exists for no more than 20% of the operation period of said vessel.

19. The process according to claim 18 wherein said expanded region of contact particles exists for no more than 10% of the operation period of said vessel.

20. The process according to claim 18 wherein said expanded region of contact particles exists for no more than 1% of the operation period of said vessel.

* * * * *